United States Patent
Hamilton et al.

Patent Number: 5,198,277
Date of Patent: Mar. 30, 1993

[54] PATTERN-TUFTED, FUSION-BONDED CARPET AND CARPET TILE AND METHOD OF PREPARATION

[75] Inventors: Wayne M. Hamilton; Larry E. Mullinax, both of Lagrange, Ga.

[73] Assignee: Interface, Inc., Lagrange, Ga.

[21] Appl. No.: 774,049

[22] Filed: Oct. 7, 1991

[51] Int. Cl.$^5$ .................. B32B 3/02; B32B 33/00; B32B 5/00

[52] U.S. Cl. ............................ 428/92; 428/85; 428/95; 428/97; 156/72

[58] Field of Search .............. 428/92, 95, 85, 97; 156/72

[56] References Cited

U.S. PATENT DOCUMENTS

| | | | |
|---|---|---|---|
| 3,174,451 | 3/1965 | Heiks | 428/92 X |
| 4,258,094 | 3/1981 | Benedyk | 428/95 X |
| 4,576,665 | 3/1986 | Machell | 428/95 X |
| 4,659,602 | 4/1987 | Birch | 428/89 X |
| 4,678,694 | 7/1987 | Claessen | 428/95 |
| 4,820,566 | 4/1989 | Heine et al. | 428/92 X |
| 4,871,602 | 10/1989 | Luker | 428/95 X |
| 4,913,952 | 4/1990 | Fowler | 428/95 X |
| 4,988,551 | 1/1991 | Zegler | 428/95 X |

Primary Examiner—George F. Lesmes
Assistant Examiner—Terrel Morris
Attorney, Agent, or Firm—Richard P. Crowley

[57] ABSTRACT

A pattern-tufted, fusion-bonded carpet, particularly a backed carpet tile, having a polymeric latex primary adhesive layer and a plurality of fibrous yarns bonded to and extending from the layer to form a face surface, the fusion-bonded carpet having a woven polyester sheet material and glass fiber tissue sheet material both secured to the primary adhesive base layer, and the fusion-bonded carpet overtufted by an overtufted pattern on the face wear surface. A method of preparing a pattern-tufted, fusion-bonded carpet which comprises overtufting a fusion-bonded carpet with the fusion-bonded carpet having a primary adhesive base layer composed of a polymeric latex material and containing a woven fiberglass and a glass fiber tissue sheet material and optionally to prepare carpet tile applying a solid, thermoplastic backing to the pattern-tufted, fusion-bonded carpet material.

29 Claims, 6 Drawing Sheets

PATTERN-TUFTED, FUSION-BONDED CARPET AND CARPET TILE AND METHOD OF PREPARATION

BACKGROUND OF THE INVENTION

Carpets, such as free-lay carpet or backed carpet tile, have been prepared as either a tufted or a fusion-bonded carpet material having a wear face surface.

Tufted carpet tile generally comprises a primary carpet base sheet material having a plurality of tufted yarns through the primary base sheet material to form a wear face surface of loop or cut pile, and usually with a precoat, such as of a latex-type material, like carboxylated styrene-butadiene-styrene precoat, on the back surface to bond the yarn to the primary back. Tufted carpet roll goods usually have a secondary backing of jute, woven polypropylene or foam. Tufted carpet tile includes a backing layer which generally comprises a solid, thermoplastic material, such as atactic polypropylene, bitumen or polyvinyl chloride, preferably with a glass fiber sheet material, such as a mesh or fleece material, embedded therein to impart dimensional stability to the carpet tile. The backing may also include a foam-type backing layer, such as a PVC or urethane foam layer. Non-thermoplastic materials, such as polyurethane, may also be used for the backing. In addition, the tufted carpet tile may include a secondary backing sheet, such as of fiberglass, polypropylene or polyester-type material, or in fact, may be laminated and/or contain a pressure-sensitive adhesive strippable layer for application to a substrate.

Fusion-bonded carpet has essentially the same backing except that the fusion-bonded carpet is characterized by a plurality of cut pile yarns, for example, of nylon or other fibrous-type material, implanted in an adhesive layer, particularly thermoplastic, like a polyvinyl chloride layer, or a hot-melt adhesive layer. Where a polyvinyl chloride plastisol is used, heating of the layer gels and then fuses the layer, while with hot-melt adhesive material, a melted layer is applied and subsequently cooled. The plurality of fibrous yarns are bonded to and extend generally upright from the adhesive base layer to form a face wear surface. Generally, a fusion-bonded carpet also includes an adjacent backing layer of a glass fiber scrim material having large open areas and a glass fiber fleece which serves as a stabilizing carrier.

Fusion-bonded carpets may be prepared employing a number of well-known, different techniques and machines in both horizontal and vertical processes. The single-end fiber implantation technique, known as the "I" Bond process, holds the ends of the severed yarns in place by a layer of an adhesive material which is backed by a fiberglass scrim-type material adjacent to a non-woven, glass fiber fleece layer. Thereafter, the free ends of the fusion-bonded carpet may be embedded in another adhesive layer as before, and the resulting sandwich-type carpet then cut with an oscillating blade to form two rolls of fusion-bonded carpet having a cut wear face surface.

Another method known as the "U" Bond process employs a yarn feed wherein the yarns are folded by a pleating system into a corrugated layer and adjacent fiberglass scrim layer and a non-woven, glass fiber fleece layer are employed and coated with a adhesive material, such as polyvinyl chloride, to form a backing layer for the corrugated structure, so that one end of the closed loops of the corrugated structure are immersed in the adhesive layer. This process is then repeated employing the other closed loop surface. The sandwich-type carpet material is then split using a slitter knife to form two rolls of fusion-bonded carpet material.

Another technique for producing "U" Bond carpet employs a vertical configuration bonding machine wherein pleated or corrugated yarn is placed between a pair of vertical heaters or coolers and formed into a corrugated layer with each side of the layer inserted into a PVC or hot-melt adhesive layer and backed by the glass fiber mesh material and glass fiber fleece material, with the hot-melt adhesive heated and applied in a vertical configuration, and the resulting sandwich carpet material cut by an oscillating blade or saw to form two separate rolls of fusion-bonded carpet.

The fusion-bonded carpet material prepared by these various processes can then be converted into carpet or carpet tile with the application of a suitable backing layer and cutting or trimming it into suitable form.

It is desirable to provide for a new and improved pattern-tufted, fusion-bonded carpet material, including a carpet tile, which is characterized by a fibrous, overtufted design pattern on the face wear surface and for a method for preparing such carpet material.

SUMMARY OF THE INVENTION

The invention relates to a pattern-tufted, fusion-bonded floor covering, such as a carpet, and particularly to a pattern-tufted, fusion-bonded carpet tile, having a fibrous, tufted, overlay pattern on the wear face surface thereon and to a method of preparing such material.

A pattern-tufted, fusion-bonded floor covering, such as a carpet, roll goods or carpet tile, having a fibrous face wear surface with a overtufted selected pattern on the face wear surface has been discovered, which carpet comprises: a primary adhesive layer formed form a water-based polymeric latex material; and a plurality of fibrous yarns bonded to and extending generally upright from the primary adhesive layer to form a face layer surface. The carpet includes a woven synthetic fiber sheet material; a non-woven glass fiber fleece sheet material adjacent to the woven synthetic fiber sheet material, and the glass fiber sheet material and the woven synthetic fiber sheet material bonded by the polymeric latex material to the primary adhesive layer. The carpet also has a plurality of tufted loop or cut pile yarns having a one and the other end and extending from the face wear surface to the primary adhesive layer, the woven synthetic fiber sheet material and the glass fiber fleece sheet material, the tufted yarns at the one end forming a selected overtufted pattern on the face surface and with the other end extending outwardly from the glass fiber tissue sheet material on the back surface of the carpet.

The invention also includes a method of producing a pattern-tufted, fusion-bonded carpet having a fibrous face surface and a fibrous, overtufted selected pattern on the face wear surface thereon, particularly a carpet tile material which method comprises providing a fusion-bonded carpet material composed of a primary adhesive layer formed from a water-based polymeric latex material, the fusion-bonded carpet having a plurality of fibrous yarns bonded to and extending generally upward from the primary adhesive layer to form a face wear surface, and the fusion-bonded carpet having a woven synthetic fibrous sheet material and a glass fiber sheet material adjacent to the woven fibrous sheet material and both bonded by the polymeric latex material to the primary adhesive layer. The method includes tufting a plurality of yarns through the fusion-bonded carpet in a selected pattern to form a selected, overtufted pattern on the face surface of the fusion-bonded carpet.

Prior art fusion-bonded carpets and carpet tiles are characterized by toughness, good bonding and high and good fiber density, since, most of the fibrous yarns implanted in the base adhesive layer from the top surface are not wasted by forming loops through the back surface. The present fusion-bonded carpets and carpet tiles do not permit any design or pattern flexibility, since it is most difficult to implant fibers in the base adhesive layer to form a textured or design pattern on the face wear surface. Presently, fusion-bonded carpets and carpet tiles are overprinted on the face wear surface to form a desired contrast or pattern thereon, but printing is not wholly satisfactory.

Tufted carpets and carpet tiles permit more design flexibility and different colors and types of yarns and styles may be formed using a tufted design. For example, in one embodiment, by a computer-controlled, individually controlled, needle tufting machine and operation, the needles are mounted in individual carriers and the control system determining the placement of tufts for the desired pattern. The single-needle tufting machine also provides for the cutting of the yarn loops on the back surface in the same or simultaneous operation by a hook and knife arrangement. Therefore, it is desirable to use overtufting technology in connection with fusion-bonded carpets and carpet tiles. However, present fusion-bonded carpets are not successfully overtufted.

It has been found that overtufting of present fusion-bonded carpet material cannot be successfully accomplished in that the present fusion-bonded carpets generally employ a base adhesive layer comprising a polyvinyl chloride or hot-melt adhesive material. When fusion-bonded carpets containing the base adhesive layer are tufted, the base adhesive layer tends to grab the tufting needles creating friction and heat and leading to a temperature rise in the carpet, and in addition, additional horsepower or power is required to make the needle penetrate the fusion-bonded carpet. Also, the polyvinyl chloride or hot-melt adhesive material forming the base adhesive layer of the present fusion-bonded carpet tend to be viscous after heating and grab and cling onto the needles creating substantial, continuous operation difficulties in the overtufting operation.

Therefore, it has been found necessary to avoid the employment of the usual polyvinyl chloride resin and hot-melt-type adhesives used as the base adhesive layer for a fusion-bonded carpet and in place to employ a less friction-creating polymeric materials, typically, non-PVC polymeric latex materials, to form the adhesive base layer of the fusion-bonded carpet. Importantly, it has been found necessary to employ a water-based latex polymeric adhesive layer, which latex generally comprises a composition of a polymer together with inert fillers, such as limestone and/or carbon black particles to impart electrically conductive properties to the base layer, surfactants, defoamers, flame retardants, such as aluminum trihydrate, and other conventional additives employed with latex compositions. The latex base layer may be comprised of a wide variety of polymers, but the polymer selected must be compatible with any resulting backing material employed in the preparation of carpet tile. The adhesive base layer should not comprise the typical polyvinyl chloride or hot-melt adhesive materials conventionally employed with fusion-bonded carpets. In one embodiment, for example, and adhesive base latex layer may comprise a vinyl latex but more particularly for example where a PVC backing layer is to be employed, a compatible ethylene vinyl acetate base latex adhesive material.

In another embodiment wherein the backing layer may comprise a bitumen backing layer, then the base adhesive latex material may comprise for example styrene-butadiene or a carboxylated styrene-butadiene latex. The employment of the base latex adhesive layer thus avoids the difficulties associated with the prior art, thermoplastic base adhesive materials. The vinyl latex composition should be compatible with the backing layer and minimize PVC plasticizer extraction where a PVC backing layer is employed. Typical latex polymers which are suitable may include, but not be limited to: methacrylic and acrylic acids and esters; acrylic and acrylate-vinyl polymers; acrylonitrile; and olefin-vinyl acetate polymers, like ethylene vinyl acetate. The base adhesive layer may be generally applied in an amount of 30 to 70, e.g. 40 to 60, ounces per square yard to form a base adhesive layer.

Part of the difficulty associated with overtufting of present fusion-bonded carpet material is that such carpet material in addition to having PVC or hot-melt adhesive also employ an open glass fiber scrim material having large, open meshes together with a glass fiber fleece material adjacent thereto, both of which are laminated on the back surface by the base adhesive layer. It has been found that overtufting of the present fusion-bonded carpet tends to fracture the glass fiber scrim material employed. The rupture of the glass fiber mesh sheet material employed by overtufting results in a reduction in the holding power of the stitches of the tufted yarns in the fusion-bonded carpet. It is therefore important that the glass fiber scrim sheet material can be replaced by a woven, synthetic fiber sheet material, for example of a screen-like synthetic fabric, such as a woven polyester, with the woven, synthetic fiber sheet material generally adjacent a non-woven, porous, glass fiber tissue or fleece sheet material. This combination of the woven polyester and the non-woven glass fiber tissue material permits overtufting of the fusion-bonded carpet and holding of the tufted yarns. The substitution of a non-woven polyester sheet material or other non-woven sheet material for the woven, synthetic fiber sheet material has been found to be unsatisfactory.

The woven polyester sheet material generally resembles a fine screen-type material comprising a majority of polyester fibers representing a plurality of generally squared, closely woven openings, for example, having a pick range of about 20 to 40, for example 32×36 in one embodiment. It has been found that the woven polyester sheet material is not fractured by the needles of the overtufting operation and provides and holds in the individual tuft yarns in place. Polyester is the preferred fiber employed due to its high temperature characteristics and strength; however, if lower temperatures are used in backing of the carpet then other fibers, such as olefinic fibers, like as polypropylene fibers or combinations of polyester and polypropylene woven fibers are suitable. It is essential where dimensional stability is required that the woven fibrous sheet material be employed directly adjacent and be bonded to the base layer of a glass fiber fleece sheet material which imparts dimensional stability to the resulting fusion-bonded carpet, while for roll goods, the glass fleece may not be necessary.

The overtufting of the fusion-bonded carpet is carried out by conventional overtufting machines and techniques. Typically, a computer-controlled, design-selective, needle tufting machine is used where the overtufting operation may be carried out on the back or the face of the carpet, or both. In one embodiment, as illustrated, tufting is through the face of the carpet to form a plurality of closed, tufted loops on the face surface of the carpet with the tufted yarn having a one end and an other end, the one end extending initially as a loop or cut loop generally above the face wear surface of the fusion-bonded carpet and extending through the base adhesive layer, a woven, synthetic fibrous sheet material, and the glass fiber fleece or fleece material with the other end of the yarn on the back surface of the tissue or fleece material. The tufting machine will tuft and then cut in the same operation.

Optionally, if desired, the cut ends on the back surface of the glass fiber fleece material of the fusion-bonded carpet may be bonded in place by employing a latex precoat material which would be compatible with any backing layer to be applied. Overtufting provides for a selected pattern on the face wear surface of the fusion-bonded carpet and typically, the design may be the same or different yarn and may have the same or different texture, quality, color and type than the yarns employed in the face wear surface of the fusion-bonded carpet to provide for the selected design.

After overtufting, and optionally coating the back surface, then the face surface is typically subject to one or more conventional shearing operations so as to cut the closed loop, tufted yarn on the face surface and to provide for the cut, tufted yarn to have the same general height as the height of the face wear surface fibers. The carpet tile backing may include thermoplastic or non-thermoplastic materials, for example, a solid backing material of bitumen, atactic polypropylene, olefin, ethylene vinyl acetate, thermoplastic elastomers, polyurethanes and polyvinyl chloride.

Tufted and fusion-bonded prior art carpet tile are shown for example in U.S. Pat. No. 4,522,857, issued Jun. 11, 1985, and U.S. Pat. No. 4,871,603, issued Oct. 3, 1989. Further, U.S. Pat. Nos. 4,010,301 and 4,010,302, issued Mar. 1, 1977, hereby incorporated by reference, illustrate carpet tiles and a method of preparing a fusion-bonded carpet tiles with dual reinforcement backing layers. The pattern-tufted, fusion-bonded carpet material of the invention may be prepared as carpet tiles by backing with the same or similar techniques as described in such patents employing various backing layers, and optionally employing fiberglass sheet material to stabilize the backing layers.

The invention will be described for the purposes of illustration only in connection with certain embodiments; however, it is recognized that those persons skilled in the art may make various modifications, changes, additions and improvements to the illustrated embodiments, all falling within the spirit and scope of the invention.

DESCRIPTION OF THE EMBODIMENTS

Figure 1:
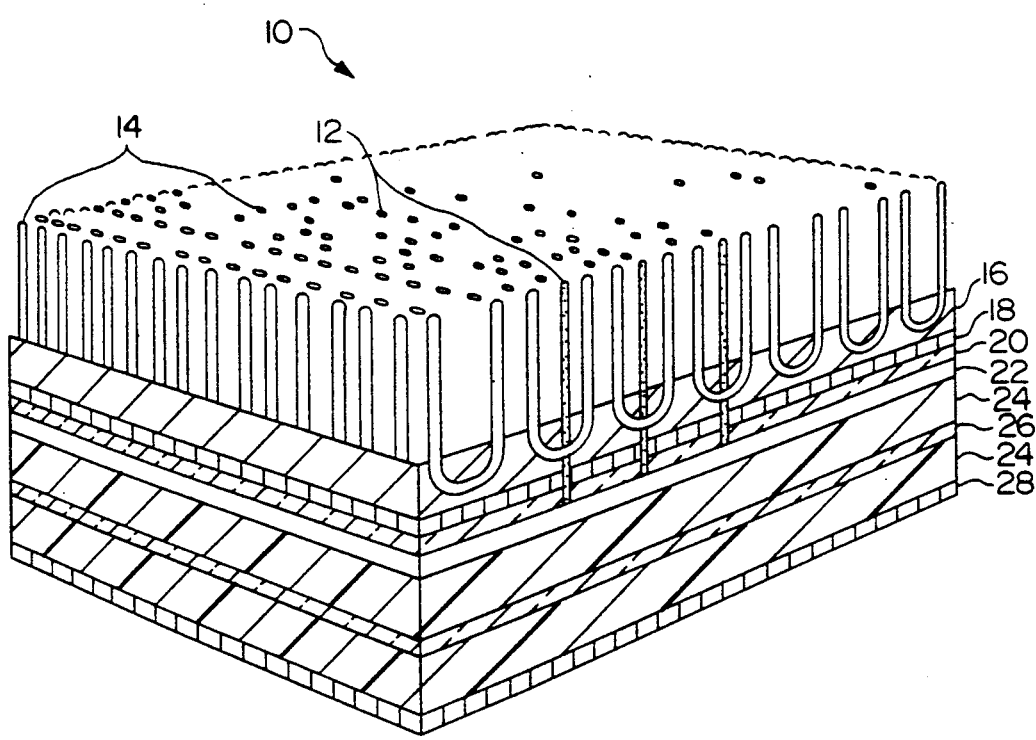
FIG. 1 is a perspective, illustrative, sectional view of a pattern-tufted, fusion-bonded carpet of the invention.

FIG. 1 is an illustration of a pattern-tufted, fusion-bonded carpet tile of the invention 10 showing a plurality of tufted fibers 12 and a face surface composed of fusion-bonded fibers 14, the tufted fibers 12 illustrating a tufted line on the face wear surface, the face wear surface being formed by the tufted fibers 12, and the fusion-bonded fibers 14 which have been sheared to the same general height, and which fibers comprise nylon fibers, with the tufted fibers 12 of a different color showing a tufted line pattern. The carpet tile 10 includes a latex adhesive layer 16 composed of an ethylene-vinyl acetate latex composition as follows: ethylene-vinyl acetate latex 62½% solids; dry weight 100 parts; flame retardant trihydrate aluminum 150 parts; filler-conductor carbon black dispersion 26% solids; 2–5 parts thickener 0.01 parts; and defoamer 0.01 parts.

The carpet 10 also includes fusion-bonded fibers 14 with one end in the latex adhesive layer 16, a woven polyester layer 18 having a 32×36 pick adjacent a glass fiber, porous tissue layer 20 laminated to the base latex adhesive layer. Optionally, another latex adhesive precoat layer 22 is employed to lock in the ends of the tufted fibers 12 which are on the surface of the glass fiber fleece sheet 20. This adhesive latex layer 22 would be required for example if the pattern-tufted carpet material was to be used as a free lay carpet. However, where a backing layer is to employed, such a layer is only optional. FIG. 1 illustrates the carpet tile 10 having two PVC backing layers 24 with a glass fiber mesh material 26 added within the PVC backing layer 24 to impart dimensional stability thereto, and which back surface 28 may also optionally be embossed.

Figure 2:
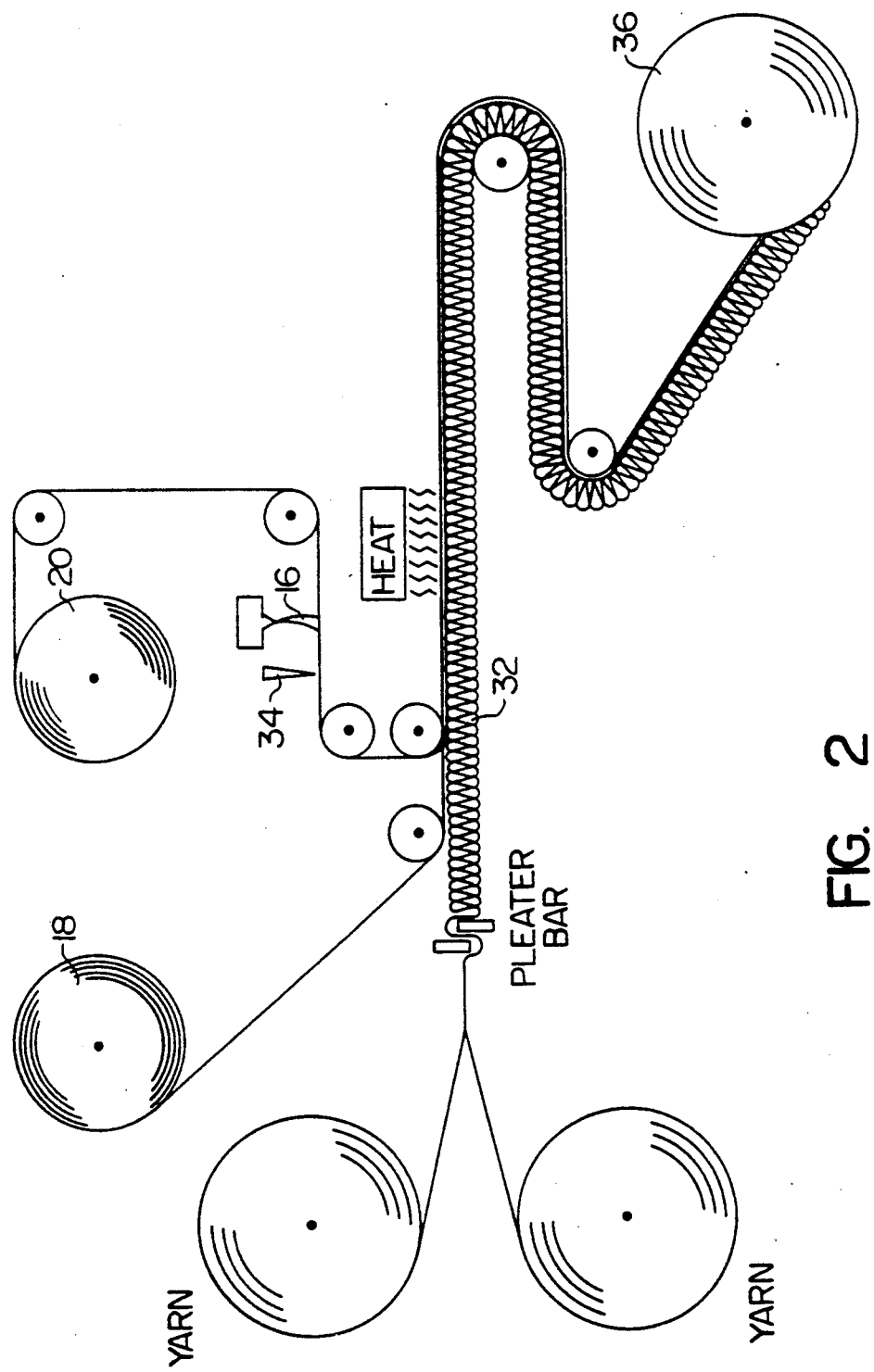
FIG. 2 is a schematic illustration of the first stage in the preparation of a fusion-bonded carpet of the invention.
Figure 3:
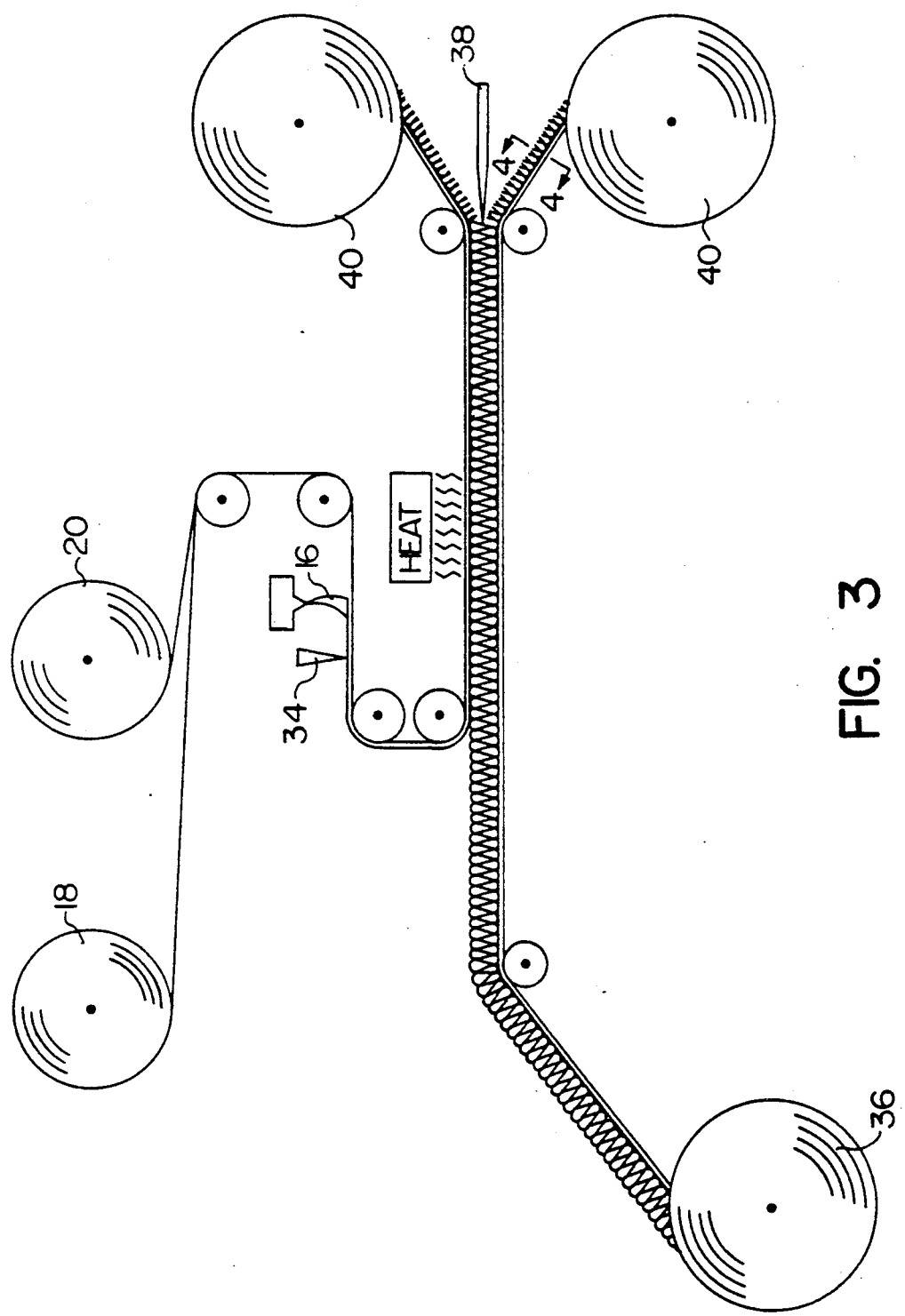
FIG. 3 is a schematic illustration of the second stage in the preparation of a fusion-bonded carpet of the invention.

FIGS. 2 and 3 are directed to Stage 1 and 2 U-tuft, fusion-bonding technique, as illustrated, representing a yarn beam feed being formed into a corrugated layer 32 by a pleater bar with the base adhesive latex composition 16 being applied by a doctor blade 34 to the back surface of a glass fiber fleece sheet material 20 with a woven polyester sheet material 18 being fed, and with the adhesive layer heated to form a base adhesive layer 16 of a fusion-bonded carpet shown as a Stage 1 carpet 36. The Stage 1 carpet 36 is thus shown in FIG. 3 as being processed using the woven polyester 18, the glass fiber fleece 20, the adhesive latex 16 applied by a doctor blade 34, heated and then severed by a slitter blade 38 to form fusion-bonded carpet material 40.

Figure 4:
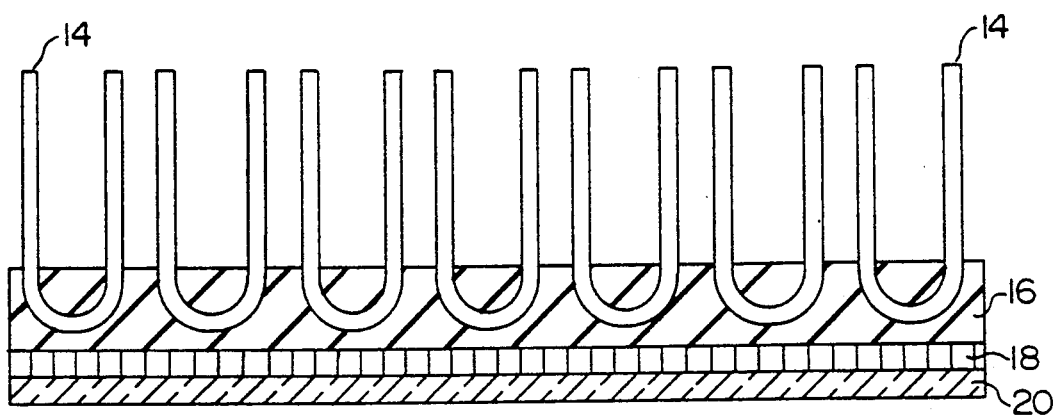
FIG. 4 is an enlarged, sectional view of the fusion-bonded carpet prepared by the method in FIGS. 2 and 3.

FIG. 4 is an enlarged sectional view of the resulting fusion-bonded carpet material 40 prior to overtufting, shearing and backing. During the fusion bonding, the fibers 14 are embedded in a base latex adhesive layer 16 with a woven polyester layer 18 and a glass fiber fleece layer 20 as the backing.

Figure 5:
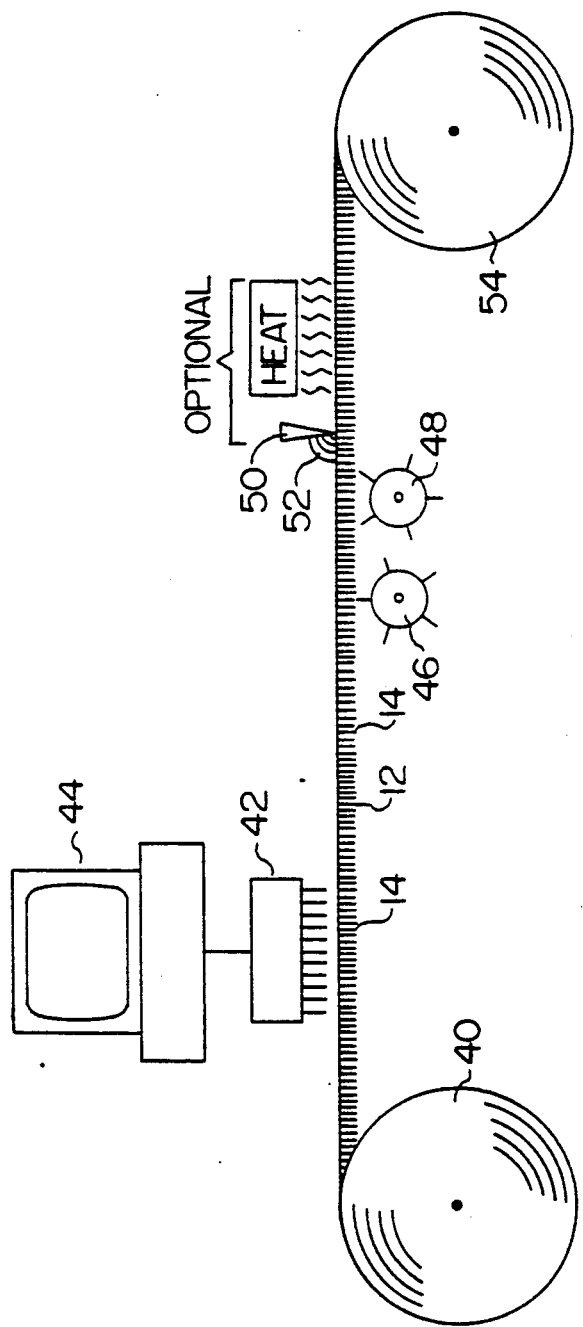
FIG. 5 is a schematic illustration of the overtufting and shearing of a fusion-bonded carpet of the invention.

FIG. 5 is directed to a fusion-bonded carpet 40 and to the operation of overtufting and shearing the carpet and shows the carpet 40 face down with a tufting using an individually controlled tufting machine 42 controlled through a computer control 44 with tufting needles tufting through the back of the carpet 40 to place tufted fibers 12 in a design pattern, such as lined pattern as illustrated more particularly in FIG. 1. A particular machine suitable for the overtufting would be an individually controlled needle Cobble tufting machine of the Cobble Tufting Machine Company of Dalton, Ga. in which the desired overtufted pattern is controlled on the tufting machine from a computer-driven, solid state control system 44 with the selected tufted patterns loaded into the system 44 from a floppy disk prepared on a separate pattern-generating system. The overtufted, backed and cut carpet with a face surface of tufted fibers 12 and fusion-bonded fibers 14 is then subject to one or more shearing operations (two) as illustrated in 46-48 wherein tufted fibers 12 and the fusion-bonded fibers 14 are approximately the same cut height. If desired, the tufted fibers can be or remain higher than the base height. Optionally, then, a latex adhesive coating 52 may then be applied with a doctor blade 50 or other applicator means to the back surface, then heated in order to lock in the free ends of the fibers 12 on the glass fiber fleece sheet material 20 to produce a patterned, overtufted, fusion-bonded carpet 54. The resulting carpet may be used as a free lay carpet, backed or otherwise processed or treated.

Figure 6:
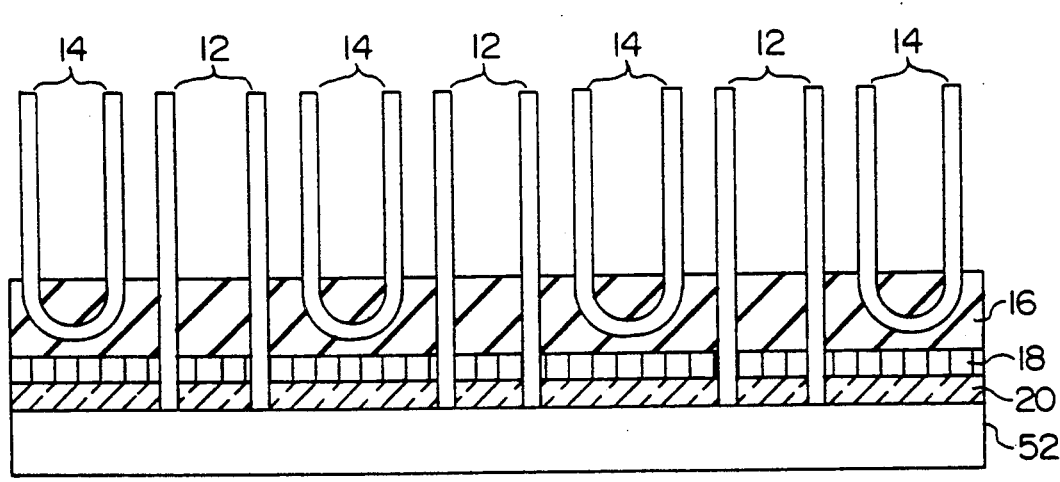
FIG. 6 is an enlarged, sectional view of the pattern overtufted, sheared, fusion-bonded carpet prepared by the method in FIG. 5.

FIG. 6 is an enlarged sectional view of the patterned, overtufted, fusion-bonded carpet 54 as produced in the process of FIG. 5.

Figure 7:
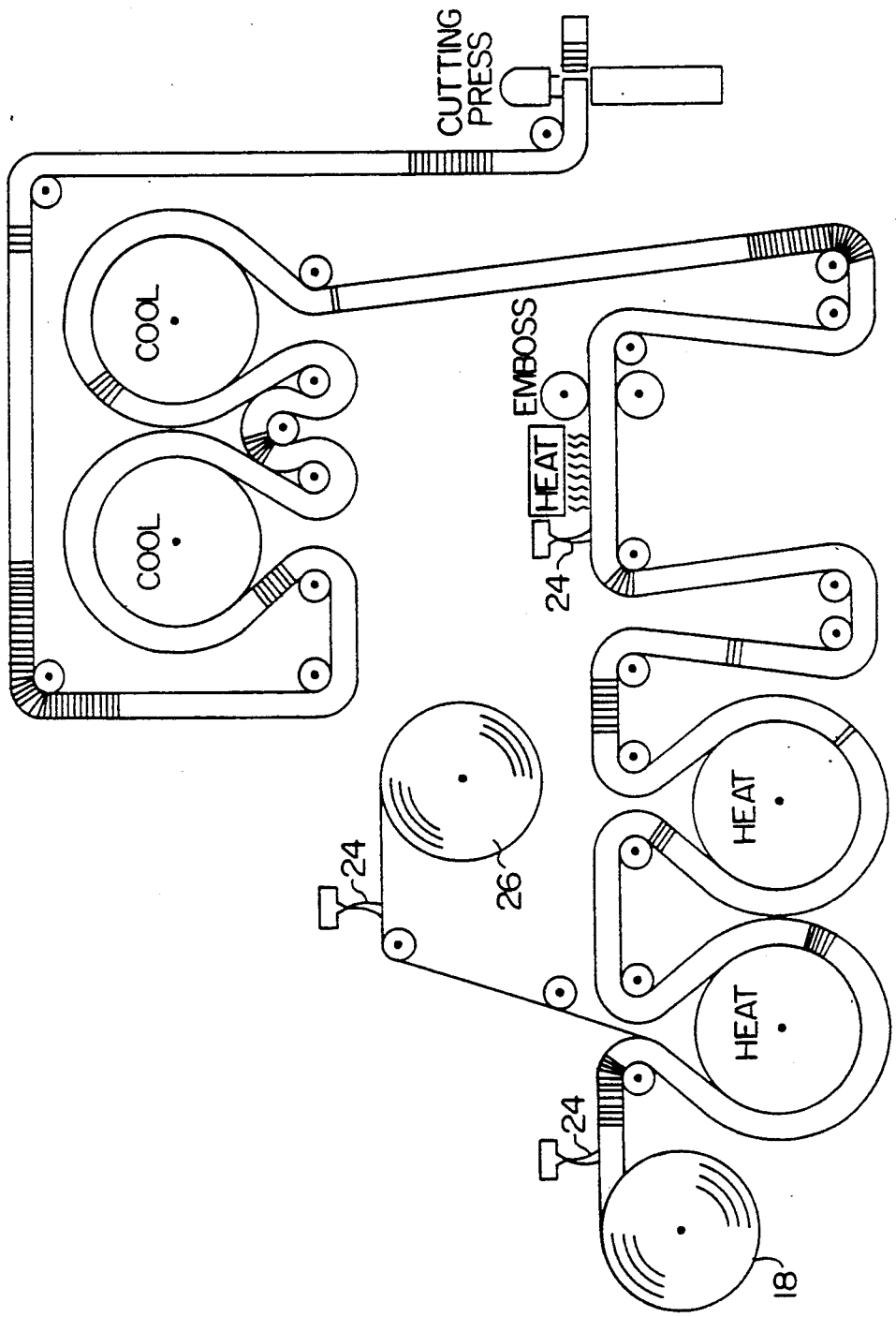
FIG. 7 is a schematic illustration of the application of a backing layer to the pattern-tufted, fusion-bonded carpet material of FIG. 6 to provide the carpet tile of FIG. 1.

FIG. 7 is a schematic illustration of the application of a solid vinyl backing layer to the patterned, overtufted, fusion-bonded carpet 54 to produce the patterned, overtufted, fusion-bonded carpet tile as illustrated in FIG. 1. The backing process includes the application of a polyvinyl chloride plastisol layer 24 to the back surface of the carpet 54 and the application of a non-woven, glass fiber, such as a mesh or scrim material, for dimensional stability. The application of a vinyl coating 24 to the surface of the non-woven glass fiber 26 is followed by subsequent heating as illustrated and the application of a further coating 24 over the non-woven glass fiber sheet 26 and the heating of the coating to gel and fuse the vinyl resin and the embossing of the back surface of the resulting vinyl-backed carpet material. In the backing process illustrated in FIG. 7, the back surface of the carpet tile is embossed. After gelling, fusion and embossing the multi-layered backing layer, the carpet is then cooled and sent to a cutting press for cutting into carpet tile.

The pattern-tufted, fusion-bonded carpet tile and the method of preparing same as described and illustrated provides for a unique, dimensionally stable, overtufted, fusion-bonded carpet tile having a desired overtufted pattern on the face wear surface and overcomes the difficulties associated with prior art attempts to produce such a carpet tile and provides a carpet tile with a unique cut and sheared tufted pattern on the face surface.

What is claimed is:

1. A pattern-tufted, fusion-bonded carpet having a fibrous pile face wear surface with a tufted pile pattern thereon, wherein the carpet comprises:
    a) a woven synthetic fiber sheet material;
    b) a nonwoven glass fiber fleece sheet material adjacent to the woven synthetic fiber sheet material;
    c) a primary adhesive layer formed from a water-based polymeric latex material, which polymeric latex material bonds the synthetic fiber sheet material impregnates and the glass fiber fleece sheet material together, and forms a primary adhesive layer on the surface of the synthetic fiber sheet material;
    d) a plurality of fibrous yarns bonded to and extending generally upright from the primary adhesive layer, to form a fibrous pile face were surface; and
    e) a plurality of tufted yarns extending from the pile face wear surface through the primary adhesive layer, the synthetic sheet material and the glass fiber fleece sheet material, the tufted yarns forming a selected tufted pattern on the face wear surface, and with the other end of the tufted yarns extending outwardly from the back surface of the glass fiber fleece sheet material.

2. The fusion-bonded carpet of claim 1 wherein the woven synthetic fiber sheet material comprises generally squared, closely woven openings having a pick range of about 20 to 40.

3. The fusion-bonded carpet of claim 1 wherein the woven synthetic fiber sheet material comprises fibers selected from the group consisting of polyester fibers, olefinic fibers and combinations thereof.

4. The fusion-bonded carpet of claim 1 wherein the tufted yarns form a plurality of closed-loop yarns on the face wear surface.

5. The fusion-bonded carpet of claim 1 wherein the tufted yarns form a plurality of sheared yarns of the same general height as the face wear surface.

6. The fusion-bonded carpet of claim 1 wherein the water-based polymeric latex material comprises an ethylene-vinyl acetate latex material.

7. The fusion-bonded carpet of claim 1 wherein the woven synthetic fiber sheet material comprises a closely woven polyester sheet material.

8. The fusion-bonded carpet of claim 1 wherein the one end of the plurality of tufted yarns forming the selected tufted pattern are sheared yarns of about the same height as the fibrous face wear surface.

9. The fusion-bonded carpet of claim 1 which includes an adhesive coating layer on the back surface of the glass fiber fleece sheet material to secure the other end of the tufted yarns in position.

10. The fusion-bonded carpet of claim 1 wherein the tufted yarns which form the selected pattern on the face surface differ in properties, color, textures and types so as to form a distinctive, selected tufted pattern on the face wear surface.

11. The fusion-bonded carpet of claim 1 which includes a backing layer thereon secured to the back surface of the glass fiber fleece sheet material.

12. A carpet tile which includes the fusion-bonded carpet of claim 1 and also includes a solid backing layer secured to the back surface of pattern-tufted, fusion-bonded carpet.

13. The carpet tile of claim 12 wherein the solid, thermoplastic material is selected from the group consisting of: bitumen, atactic polypropylene; olefin; ethylene vinyl acetate; thermoplastic elastomers; polyurethanes; and polyvinyl chloride.

14. A pattern-tufted, fusion-bonded carpet tile having a fibrous pile face wear surface with a fibrous, tufted pile pattern thereon, wherein the carpet tile comprises:
   a) a primary adhesive layer formed from a water-based ethylene vinyl acetate latex material;
   b) a plurality of fibrous yarns bonded to and extending generally upright from the adhesive layer to form a fibrous face wear surface;
   c) a woven polyester fibrous sheet material;
   d) a porous, glass fiber fleece sheet material adjacent to the woven polyester sheet material, the woven polyester sheet material and the adjacent glass fiber fleece sheet material bonded to the primary adhesive layer;
   e) a plurality of tufted yarns extending through the primary adhesive layer, the polyester woven sheet material and the glass fiber fleece sheet material, the tufted yarns forming a selected, sheared, tufted pattern on the face wear surface of the carpet tile, the tufted yarns having a different color, type, style, texture or properties than the fibrous face wear surface, the tufted yarns sheared to about the same height as the height of the fibrous face surface, and the other ends of the tufted yarns cut and extending to the back surface of the glass fiber fleece sheet material; and
   f) a solid, thermoplastic backing layer bonded to the back surface of the glass fiber fleece sheet material.

15. A method of preparing a pattern-tufted, fusion-bonded carpet having a fibrous pile face surface with a fibrous pile tufted pattern thereon, which method comprises:
   a) providing a fusion-bonded carpet material composed of a primary adhesive layer formed from a water-based polymeric latex material, the fusion-bonded carpet having a plurality of fibrous yards bonded to and extending generally upward from the primary adhesive layer to form a face wear surface, and fusion-bonded carpet having a woven synthetic fibrous sheet material and an adjacent glass fiber fleece sheet material and both bonded to the primary adhesive layer which impregnates the woven synthetic fibrous sheet material to bond the glass fiber fleece sheet material thereto; and
   b) tufting a plurality of yarns through the primary adhesive layer, the woven synthetic fibrous sheet material and the glass fiber fleece sheet material of the fusion-bonded carpet in a selected pattern to form a selected, overtufted pattern on the face wear surface of the fusion-bonded carpet, the other end of the tufted yards extending from the back surface of the glass fiber fleece sheet material.

16. The method of claim 15 wherein the water-based polymeric latex material comprises an ethylene-vinyl acetate latex material.

17. The method of claim 15 wherein the woven synthetic sheet material comprises a closely woven polyesters sheet material.

18. The method of claim 15 which includes tufting the face wear surface of the fusion-bonded carpet in a computer-controlled manner to provide for a desired tufted pattern on the face surface thereof.

19. The method of claim 15 which includes shearing the top surface of the overtufted yarns, to form the selected pattern to about the same height as that of the face wear surface.

20. The method of claim 15 which includes selecting fibrous yarns which differ in properties, color, texture, style or type from the face surface fibrous yarns so as to form a distinctive pattern on the face wear surface.

21. The method of claim 15 which includes applying a solid, thermoplastic backing layer to the back of the pattern-tufted, fashion-bonded carpet.

22. The method of claim 21 which includes applying a backing layer of a solid, thermoplastic material, and forming carpet tiles from such pattern-tufted, fashion-bonded carpet.

23. The pattern-tufted, fashion-bonded carpet produced by the method of claim 15.

24. The pattern-tufted, fashion-bonded carpet title produced by the method of claim 22.

25. The method of claim 15 which includes forming the plurality of tufted yarns of closed-loop yarns on the face wear surface.

26. The method of claim 15 which includes applying a latex adhesive coating to the back surface of the glass fiber fleece sheet material, to secure the other ends of the tufted yarns.

27. The method of claim 15 which includes employing a computer-controlled, needle-tufting machine, to tuft the plurality of tufted yarns and to form a closed-loop-yarn, computer-controlled pattern on the face wear surface therefrom.

28. The method of claim 26 which includes cutting the tufted yarns on the back surface of the glass fiber fleece sheet material with the tufting step.

29. The method of claim 15 which includes providing a primary adhesive layer comprising a water-based polymeric latex material, a flame retardant, an inert filler and carbon-black dispersion.

* * * * *

UNITED STATES PATENT AND TRADEMARK OFFICE
CERTIFICATE OF CORRECTION

PATENT NO. : 5,198,277

DATED : March 30, 1993

INVENTOR(S) : Wayne M. Hamilton et al

It is certified that error appears in the above-identified patent and that said Letters Patent is hereby corrected as shown below:

```
In the claims, column 8, line 9, after "material" insert
--impregnates and--.
Column 8, line 10, delete "impregnates".
Column 8, line 16, delete "were" and insert -wear--
Column 8, line 56, delete "and" and insert --or--.
Column 9, line 38, delete "yards" and insert -yarns--.
Column 10, line 8, delete "polyesters" and insert -polyester--
```

Signed and Sealed this

Fourth Day of January, 1994

Attest:

BRUCE LEHMAN

*Attesting Officer*     Commissioner of Patents and Trademarks